United States Patent [19]

Moulinoux

[11] 4,094,198
[45] June 13, 1978

[54] MACHINE FOR BALANCING A BODY OF REVOLUTION

[75] Inventor: André Moulinoux, Marnes-la-Coquette, France

[73] Assignee: Facom, Morangis, France

[21] Appl. No.: 802,585

[22] Filed: June 1, 1977

[30] Foreign Application Priority Data

Jun. 4, 1976 France .............................. 76 17003

[51] Int. Cl.² ........................................... G01M 1/16
[52] U.S. Cl. ........................................ 73/460; 73/471; 73/476
[58] Field of Search ................... 73/66, 459, 460, 462, 73/471, 473, 474–478

[56] References Cited

U.S. PATENT DOCUMENTS 2,177,252  10/1939  Hanson ................. 73/473
2,322,939  6/1943   Inman .................. 73/473

Primary Examiner—James J. Gill

[57] ABSTRACT

The machine comprises a shaft mounted in a housing to rotate about a horizontal axis and arranged to carry the body of revolution in a concentric position. The shaft is also capable of oscillating in the housing about a vertical axis intersecting the horizontal axis near to an end of the shaft. An elongated indicator member is mounted in the axial extension of the shaft by a ball articulation. A measuring scale is mounted on the housing adjacent the free end of the indicator member. A deviating element is adapted, in the course of rotation of the shaft, to come momentarily in contact with the indicator member so as to deviate the indicator member relative to the scale to an extent which is a function of the magnitude of the unbalance of the body of revolution. An arrangement is combined with the ball articulation for ensuring the remanence of the deviation. The deviating element is in the form of a cam rotatable by a driving motor about an axis parallel to the axis of the shaft. The cam has a part of maximum radius which comes momentarily in contact with the indicator member in the course of rotation of the cam. The peripheral speed of the cam is substantially equal to, but in the opposite direction to, the peripheral speed of the indicator member.

12 Claims, 6 Drawing Figures

MACHINE FOR BALANCING A BODY OF REVOLUTION

The present invention relates to a machine for statically and dynamically balancing a body of revolution such as a vehicle wheel the utilization of which requires a rotation about an axis of symmetry.

Machines already exist for detecting unbalances in vehicle wheels. Some machines employ costly methods and others employ simple methods, for example the oscillation of the axis of rotation under the effect of centrifugal forces due to the unbalances, but the utilization thereof often takes a long time and most of the machines only permit determining by rotation so-called dynamic unbalances, the static unbalances being detected by gravity, that is to say by allowing the wheel, which is free to rotate, to take up the position of equilibrium thereof.

A simple machine which permits determining dynamic unbalances of a body of revolution such as a vehicle wheel is described in French Patent No. 2,161,212. In this machine, the body to be balanced is mounted on a shaft which is capable of being rotated about the axis thereof which is disposed horizontally and is also capable of oscillating about a vertical axis passing through the axis of rotation thereof owing to a mounting device which is mounted to be capable of oscillating about this vertical axis and is located near to the body to be balanced.

The opposite end of the shaft carries an indicator member which is mounted on a ball received in a cavity formed in the end of the shaft and cooperates with a scale integral with the shaft and therefore rotating with the shaft about the horizontal axis thereof.

When the shaft is rotated, as the wheel to be balanced is rendered integral therewith in such manner that the plane of the inner rim coincides with the vertical axis of oscillation, the shaft oscillates about this axis owing to the unbalance of the wheel. A deviating device in the form of a plate disposed radially with respect to the horizontal axis is then put in contact with the indicator member which thus assumes a position which is deviated from the horizontal axis position, the deviation of which is the larger as the unbalance is greater. Consequently, the relative position of the scale and the indicator member constitutes a measure of the unbalance which may be read off by the operator. However, it has been found that a measurement by means of this machine is not sufficiently precise, in particular owing to the fact that the deviating plate introduces by the effect of friction an error in the result of the measurement. Moreover, the phase shift between the real position and the apparent or measured position of the unbalance varies with the magnitude of the latter which is difficult and even impossible to visualize on the part of the operator.

An object of the invention is to provide a machine for balancing a body of revolution, and in particular a vehicle wheel, which does not have this drawback and, on the contrary, permits the obtainment of a perfectly satisfactory precision in the measurement of the unbalance, particularly in the field of the balancing of vehicle wheels. Furthermore, this machine permits by a single operation the determination not only of the magnitude of the unbalance but also the angular position thereof on the body of revolution.

According to the invention, there is provided a machine for balancing a body of revolution, such as a vehicle wheel, comprising a housing, a shaft mounted in the housing to rotate about a horizontal axis and also to oscillate about a vertical axis which intersects said horizontal axis and is located near to a first end of the shaft, mounting means for mounting the body of revolution provided adjacent to said first end for rotating said body about said horizontal axis, driving means for driving the shaft in rotation, an elongated indicator member mounted in the extension of the opposite end of the shaft through the agency of a ball articulation, a measuring scale disposed adjacent to the free end of the indicator member, and means for deviating the indicator member and adapted, in the course of rotation of the shaft, to come momentarily in contact with the indicator member at a predetermined place in the length thereof so as to achieve a deviation of the indicator member with respect to the scale which is a function of the magnitude of the unbalance of the body of revolution, the ball articulation being provided with means for ensuring the remanence of said deviation, wherein said deviating means are in the form of a cam mounted to rotate about an axis which is parallel to the axis of the shaft and associated with driving means, the cam having an upper surface or land adapted to come momentarily in contact with the indicator member in the course of a revolution of the cam and the peripheral speed of the cam being approximately equal, but of opposite direction, to that of the indicator member.

By means of these features, there is obtained a marked reduction in friction and even zero friction between the deviating means and the indicator member which contributes to an improved precision in the measurement.

Further features of the invention will be apparent from the ensuing description with reference to the accompanying drawings which are given solely by way of example and in which.

Figure 1:
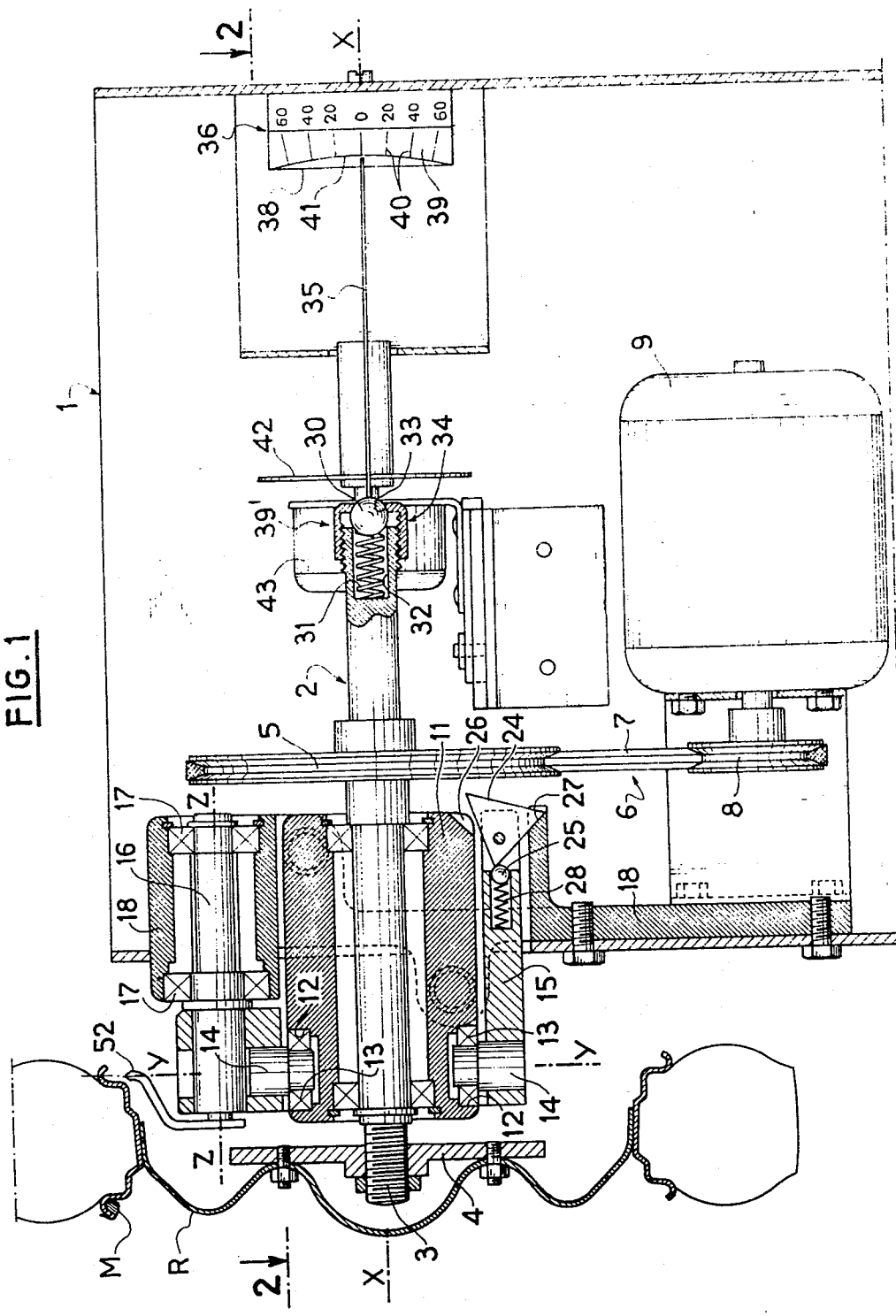
FIG. 1 is a partial sectional and elevational view of a balancing machine according to the invention.
Figure 2:
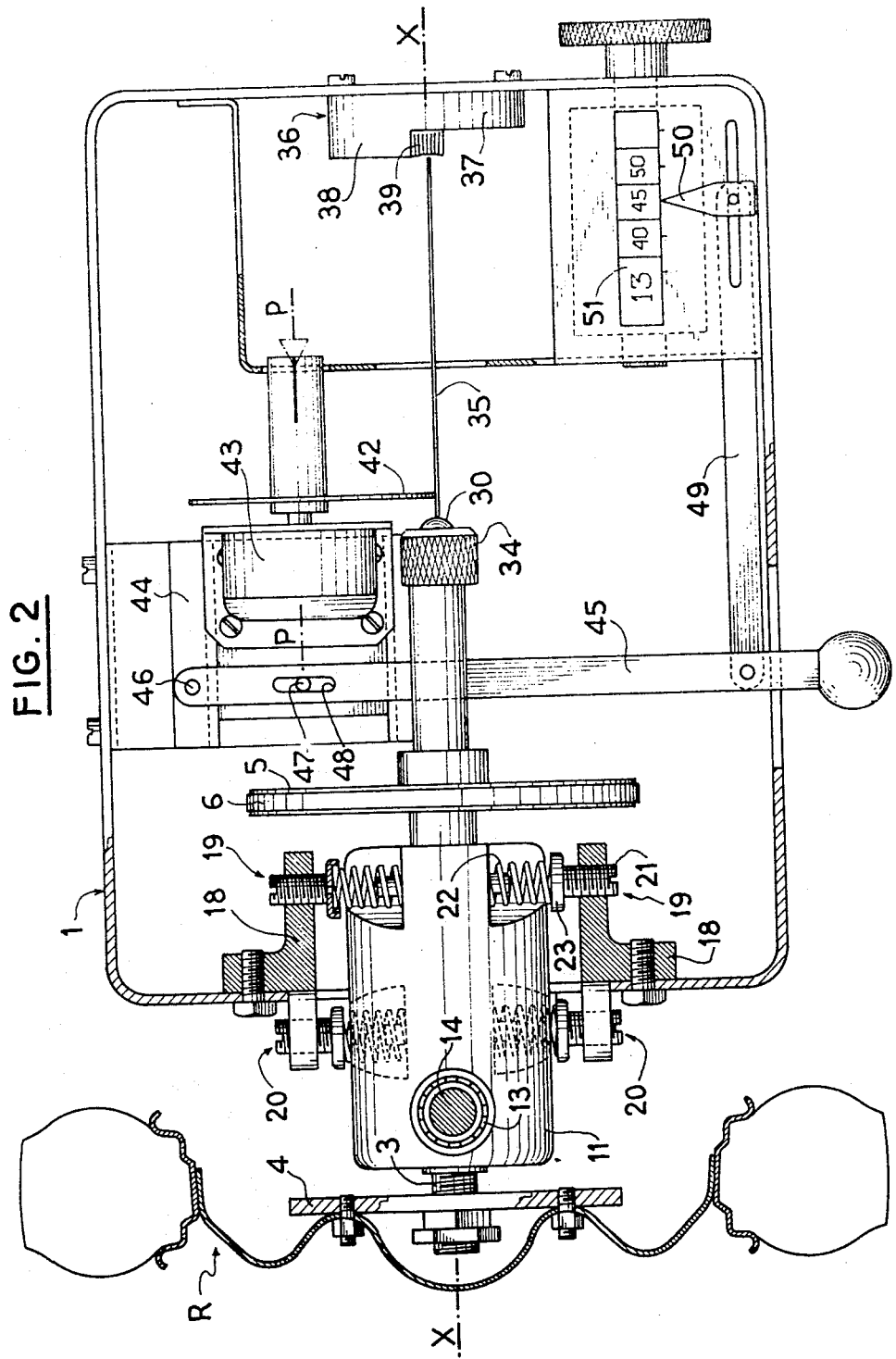
FIG. 2 is a partial horizontal sectional view taken on line 2—2 of FIG. 1.
Figure 3:
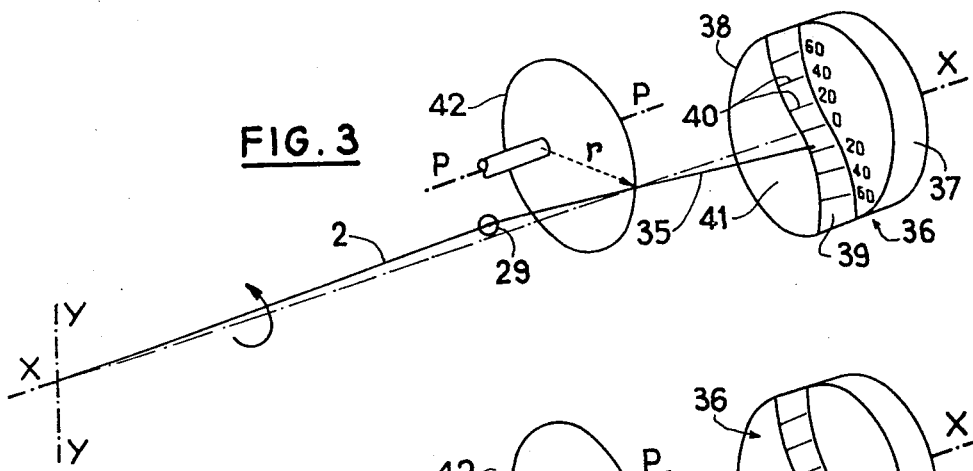
FIGS. 3 to 6 are diagrammatic perspective views illustrating the operation of the machine shown in FIGS. 1 and 2.
Figure 4:
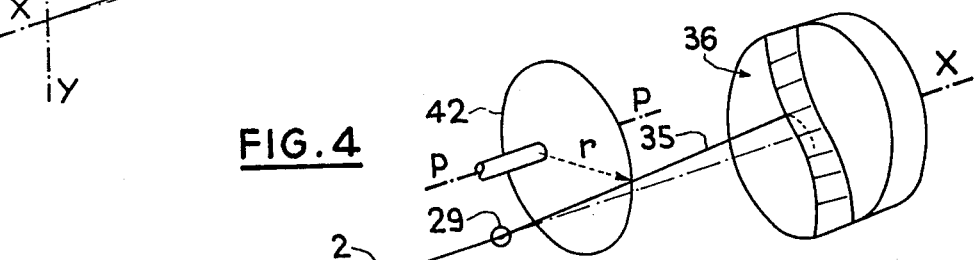
Figure 5:
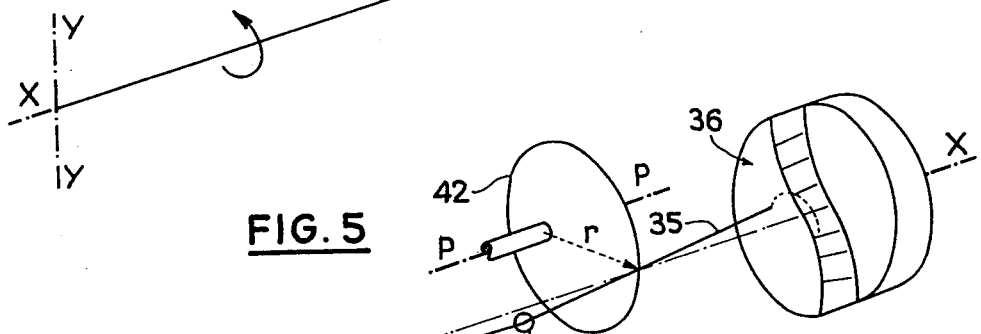
Figure 6:
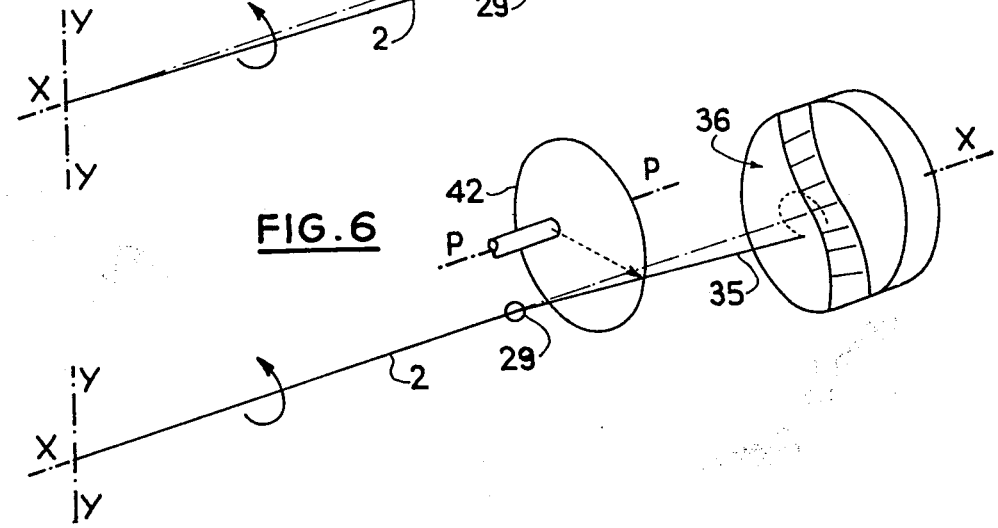

In the embodiment shown in the drawings, which is by way of example a machine for balancing vehicle wheels, there is shown a housing 1 in which a shaft 2 is mounted to be rotatable about a horizontal axis X—X. At a first end 3 of the shaft which extends out of the housing 1, the shaft 2 is integral with a radial plate 4 to which may be secured a wheel R to be balanced in such manner that the axis of the wheel coincides with the axis of the shaft 1. A driving pulley 5 which is part of driving means 6 is keyed to the shaft 2 and coupled by a V-belt 7 to a drive pulley 8 of a driving motor 9 fixed inside the housing 1.

The shaft 2 is mounted in two bearings located at the respective ends of a sleeve 11 which is coaxial with the axis X—X. Formed in the sleeve 11 in diametrally opposed positions and near to the end adjacent to the plate 4, are two cavities 12 in which are respectively mounted coaxial bearings 13 which define a vertical axis of oscillation Y—Y intersecting the horizontal axis of the shaft 1. Each bearing 13 is mounted on a trunnion 14 fixed in a pendular support 15 which is integral, at the upper end thereof, with a pin 16 having a horizontal axis Z—Z. This pin oscillates in two bearings 17 which are mounted in a support member 18 integral with the housing 1. Thus it can be seen that the shaft 2 is capable of oscillating about two perpendicular axes Y—Y and Z—Z while it can be rotated about the axis X—X thereof by the driving device 6.

However, these two movements of oscillation of the shaft 2 are limited owing to a set of adjustable elastically yieldable assemblies 19 and 20 each of which comprises an adjusting rod 21 screwed in the support 18 and a coil spring 22 which bears against the sleeve 11 and against a shoulder 23 formed on the corresponding adjusting rod 21. Thus, two assemblies 19 are adapted to limit the movement of oscillation about the vertical axis Y—Y whereas the other two assemblies 20 limit the movement of oscillation of the shaft 2 about the axis Z—Z. It will be understood that the springs 22 have for function to bias the shaft 2 to a mean position when it is not undergoing a movement of rotation with a body which has unbalance and must be balanced.

A switching member 24 in the form of a triangle and disposed in a cavity 25 in the support 18 near to the inner end of the sleeve 11, is pivotally mounted on the support 18 and is capable of assuming selectively two positions, namely a position in which one of the corners thereof extends into a cavity 26 in the inner end face of the sleeve 11 and a position in which another corner thereof extends into a cavity 27 in the support 18. The switching member 24 may be placed in either of these two positions at will by the operator by means of a linkage (not shown) which may be actuated from outside the housing 1. The positions are fixed by means of an unstable over-centre device 28 constituted by a ball and a spring disposed in a cavity in the sleeve 11. Thus if the switching means is in the position shown in FIG. 1, the shaft 2 can oscillate about the axis X—X through the medium of the sleeve 11, the pendular support 15 being locked with respect to the housing 1, whereas, in the opposite position of the switching member, the pendular support 15 is released so that the shaft 2 can effect a movement of oscillation in a direction parallel to the shaft about the axis Z—Z.

The end of the shaft 2 opposed to the plate 4 is provided with a ball articulation 39' comprising a ball 30 which is biased by a spring 31 bearing against the inner end of an axial cavity 32 in the end of the shaft 2. The ball bears against the peripheral edge of an opening 33 in the end of a cup 34 which is screwed on the end of the shaft 2. The ball 30 projects partially from the cup 34 and is integral with the end of an indicator member 35 which is in the form of a needle and extends from the shaft 2. The rating of the spring 31 is so chosen that the ball 30 can only rotate under the action of a predetermined force exerted radially on the needle. In other words, when the needle 35 is deviated or inclined with respect to the axis X—X, it maintains this deviated position notwithstanding a possible rotation of the shaft 2 about the axis X—X or the oscillation to which the shaft is subjected.

An assembly 36 constituting a scale is secured in alignment with the shaft 2 and needle 35 on the inner wall of the housing 1. This assembly is in the form of a rather thick circular device 37 centered on the axis X—X and provided with a projecting portion 38 which defines a face 39 generally approximately oriented in the vertical diametral plane of the disc 37. However, as can be seen in FIGS. 3 to 6, this face 39 slightly deviates away from this plane on each side of the axis X—X, namely in opposite directions, and thus takes on approximately the shape of an S. The purpose of this particular shape will be understood hereinafter. A scale 40 graduated in units of weight, for example grams, is marked on the face 39. Moreover, the projecting portion 38 has an end face 41 in the shape of a portion of a sphere the centre of which is located on the axis X—X.

The needle 35 cooperates with a deviating means 42 which is in the form of an eccentric disc constituting a cam mounted on the output shaft of a driving motor 43. This output shaft has an axis P—P. The motor 43 is placed on a carriage 44 which is movable in translation in a direction parallel to the axis X—X. The carriage 44 may be displaced by a control lever 45 which is pivotally mounted on a journal 46 which is fixed with respect to the housing 1 and coupled to the carriage 44 by a pin 47 integral with the carriage and received in an elongated aperture 48 in the lever 45. The latter is also pivotally mounted on a rod 49 which carries at the free end thereof an index 50 which is movable in front of a scale 51 graduated in units of weight, for example grams. Consequently, when the lever 45 is shifted, the cam 42 moves along the lever 35 while the index 50 moves in front of the scale 51, it being understood that the displayed value increases as the cam 42 moves away from the ball articulation 29.

The distance between the axes P—P and X—X is such that, in rotating, the needle 35 can only be in contact with a small portion of the periphery of the cam. In other words, the radius *r* of the cam (FIGS. 3-6) corresponding to the highest surface of the cam is slightly less than this distance bearing in mind the diameter of the needle 35. Moreover, the peripheral speed of the cam 42 is chosen to have a value which is roughly equal to that of the needle 35 when the shaft 2 is driven at its nominal speed. For example, the speed of rotation of the shaft 2 may be 300 rpm and the speed of rotation of the cam 4 rpm.

The machine also comprises a marker member 52 secured to the support 18, its free end being disposed in the plane perpendicylar to the axis X—X which contains the axis Y—Y. The marker member 52 is adapted to facilitate the positioning of the plate 4 carrying the wheel 5 axially so that the plane of the inner rim coincides with the axis Y—Y.

The machine operates in the following manner:

The wheel R is secured to the shaft 2 through the agency of the plate 4 in such manner that the plane of the inner edge of the rim contains the axis Y—Y (FIG. 1). The switching member 24 is brought to the lower position (as illustrated), the cam 42 is in a position to clear the needle 35. The needle is in any angular position with respect to the axis X—X. The wheel R is then driven in rotation by the driving device 16 and the cam 32 is driven in rotation by the motor 43. All the unbalances which are not located in the vertical plane of the rim containing the axis Y—Y produce by the effect of their centrifugal force a torque about this axis Y—Y. This torque is maximum when the resultant of the centrifugal forces is horizontal. The shaft 2 then starts to oscillate about the axis Y—Y on each side of a mean position which corresponds to the axis X—X of the shaft 2 when it is at rest. When the maximum radius *r* of the cam 42 moves to the horizontal position, it touches the needle 35 and its point of contact with the needle 35 is brought to a vertical plane which passes through the axis X—X. This point of contact therefore describes a portion of a vertical straight line which extends at equal distances on each side of the axis X—X (see FIGS. 3 to 6). Indeed, as the oscillations of the shaft 2 are small, it may considered that the distance from the point of contact to the centre of the ball 30 is constant and that this point P therefore moves along a vertical line. When the cam 42 is once again in a position which clears the needle 35, the latter has assumed a certain remanent angular position with respect to the shaft 2 and the friction of the ball 30 on the cup 34 maintains it in this position whereby the free end of the needle 35 describes roughly an ellipse in space. The shaft 2 and the cam 42 are then stopped. The amplitude of the oscillations of the shaft 2, and consequently the deviation of the needle 35, are a function of the magnitude of the unbalances of the wheel R and the position of the free end of the needle 35 is related to the position of the resultant of the latter. However, the dynamic phenomena of the unbalances in conjunction with the kinematic phenomena of the shaft 2, have for result that there is a phase shift between the angular position of the unbalances of the wheel R and the angular position of the free end of the needle. With the scale 36 suitably graduated and angularly set, by bringing the free end of the needle 35 by manual rotation of the wheel R in front of the S-shaped edge of the face 39, the value of the weight or mass for compensating the unbalances to be put on the outer edge of the rim of the wheel and the position thereof on the circumference of this rim will be immediately read off (a compensating weight M has been shown diagrammatically in FIG. 1). For convenience of the fixing of this weight, the scale 36 is fixed angularly on the housing 1 in such manner that the compensating weight must be placed in the upper part of the wheel R. In practice, it is known that the aforementioned phase shift varies slightly with the magnitude of the unbalances. The S-shape of the face 39 permits finding the exact position of this weight as a function of its magnitude.

If, subsequent to the correction, the wheel R is again made to rotate, this wheel will no longer oscillate since all the unbalances which produced a torgue about the axis Y—Y have been compensated for. However, unbalances could remain in the plane of the rim containing this axis Y—Y.

In order to correct the latter, the following procedure is followed:

With the switching member 24 in the upper position thereof, the wheel R and the cam 42 are made to rotate. Then, under the effect of centrifugal forces of the remaining unbalances, the shaft 2 will swing about the horizontal axis Z—Z in the manner of a simple pendulum. The procedure for detecting the new compensating weight or mass will be followed in exactly the same way as in the first operation. As the movements and the forces are inverted, the magnitude of the unbalances will read off in the lower part of the scale 36. The correction of the unbalances, that is to say, the mounting of the compensating weight or mass will be effected on the inner edge of the rim of the wheel R.

In the two operations, the amplitude of the oscillations of the shaft 2 is a function in particular of the inertia of the wheel R. In order to still read off the grams on the scale 36 it will be necessary to displace the motor 43 in translation by means of the lever 45 so as to bring the cam 42 more or less near to the ball 30 and thus, by the action of the leverages, modify the angular deviation of the needle 35. This displacement must be effected according to a calculation which takes into account the inertia of the wheel R. For example, it is possible to take into account the diameter of the rim and the type of tire mounted on the wheel R. The scale 51, in cooperation with the index 50, gives a sufficient approximation to effect this calculation automatically.

Note in particular that owing to the relation between the speed of rotation of the needle 35 on one hand and the speed of rotation of the cam 42 on the other, friction between these two elements is reduced to a minimum so that the deviation of the needle translates as near as possible the magnitude of the unbalances to be measured, notwithstanding the fact that the cam 42 remains in contact with the needle during several revolutions of the shaft 2.

Having now described my invention what I claim as new and desire to secure by Letters Patent is:

1. In a machine for balancing a body of revolution, such as a vehicle wheel, comprising a housing, a shaft mounted in the housing to rotate about a horizontal axis and also to oscillate about a vertical axis which intersects said horizontal axis and is located near to a first end of the shaft, mounting means for mounting the body of revolution provided adjacent to said first end for rotating said body about said horizontal axis, driving means for driving the shaft in rotation, an elongated indicator member, a ball articulation mounting the indicator member on a second end opposed to said first end of said shaft so that the indicator member is in the extension of said shaft, a measuring scale disposed adjacent to an end of the indicator member opposed to said articulation, and means for deviating the indicator member and adapted, in the course of rotation of the shaft, to come momentarily in contact with the indicator member at a predetermined place in the length thereof so as to achieve a deviation of the indicator member with respect to the scale which is a function of the magnitude of the unbalance of the body of revolution, the ball articulation being provided with means for ensuring the remanence of said deviation; the improvement comprising arranging said deviating means in the form of a cam mounted to rotate about an axis which is parallel to the axis of the shaft and associated with driving means, the cam having a radially outermost portion capable of coming momentarily in contact with the indicator member in the course of a revolution of the cam and the peripheral speed of the cam being approximately equal but of opposite direction to that of the indicator member.

2. A machine as claimed in claim 1, comprising means for ensuring an adjustable translation of said cam along the axis thereof for modifying the place of the point of contact of the cam with the indicator member along the indicator member.

3. A machine as claimed in claim 2, comprising a carriage mounted on the housing to move in a direction parallel to the axis of the cam, a motor mounted on the carriage and having an output shaft, the cam being mounted on the output shaft, a control lever being coupled to the carriage for shifting the cam in translation.

4. A machine as claimed in claim 3, comprising indicating means for indicating the position the cam occupies with respect to the length of the indicator member, the indicating means comprising a second scale fixed relative to the housing, an index connected to the lever and movable in front of the second scale, the arrangement being such that displacement of the index toward increasing values of the second scale corresponds to a moving away of the cam from the ball articulation of the indicator member.

5. A machine as claimed in claim 2, comprising indicating means for indicating the position the cam occupies with respect to the length of the indicator member.

6. A machine as claimed in claim 5, wherein the indicating means are graduated in units of weight.

7. A machine as claimed in claim 1, wherein the indicator member is a needle and the distance between the axis of the cam and an axis coinciding with the axis of the shaft when it occupies a mean position of oscillation thereof is substantially equal to the maximum radius of the cam.

8. A machine as claimed in claim 7, comprising a ball rotatably mounted with an interference fit in an end of the shaft, an end of the needle adjacent the shaft being mounted in said ball.

9. A machine as claimed in claim 8, comprising an axial cavity in said end of the shaft, a spring mounted in the cavity, said ball being mounted in said cavity and biased outwardly of said cavity by said spring, and a cup which is mounted on the shaft and closes the cavity and defines an opening having an edge, the ball being in bearing relation to said edge and the needle extending through said opening.

10. A machine as claimed in claim 1, wherein the scale of measurement in front of which the free end of the indicator member moves is fixed relative to the housing and is marked out with respect to a plane which is defined by a first axis which coincides with the axis of the shaft when the shaft occupies its mean position of oscillation and by a second axis which coincides with said axis about which the shaft is capable of oscillating, a zero graduation of the scale coinciding with a point on the first axis and the scale extending progressively away from said plane in a regular curve.

11. A machine as claimed in claim 10, wherein the shaft is mounted to oscillate about a second axis of oscillation which is perpendicular to the first-mentioned axis of oscillation and parallel to the axis of the body of revolution, switching means are provided for allowing selectively only one movement of oscillation of the shaft, and said scale of measurement in front of which the free end of the indicator member moves is extended on a side thereof opposed to said first axis in a curve which is traced in the opposite direction with respect to the portion located on the first side of said first axis.

12. A machine as claimed in claim 1, wherein the shaft is mounted to oscillate about a second axis of oscillation which is perpendicular to the first-mentioned axis of oscillation and parallel to the axis of the body of revolution, and switching means are provided for allowing selectively only one movement of oscillation of the shaft.

* * * * *